Jan. 18, 1927. 1,614,451
W. BARFIELD
INSTRUMENT FOR REMOVING MEAT FROM CITRUS FRUITS AND THE LIKE
Filed March 13, 1925
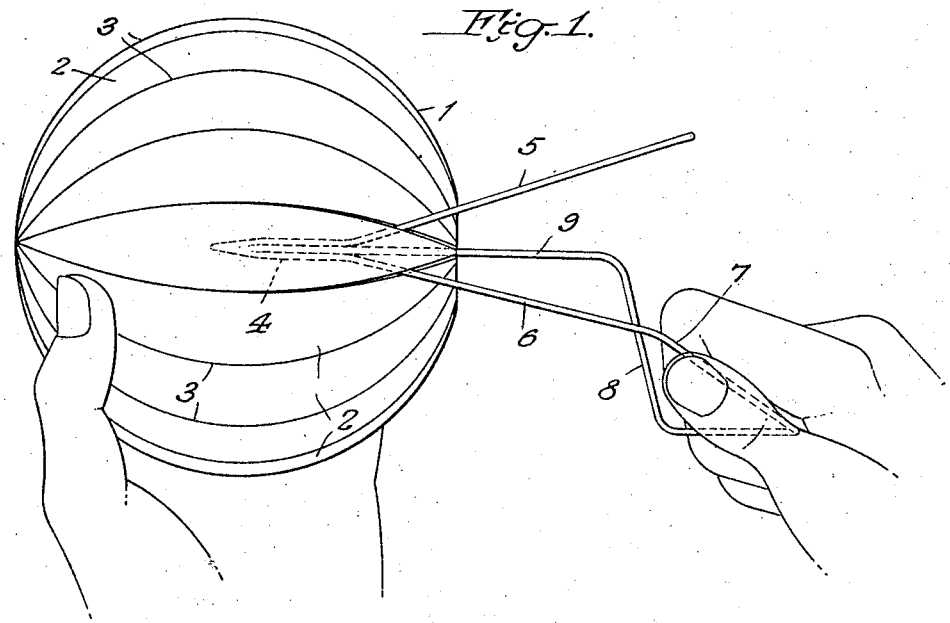
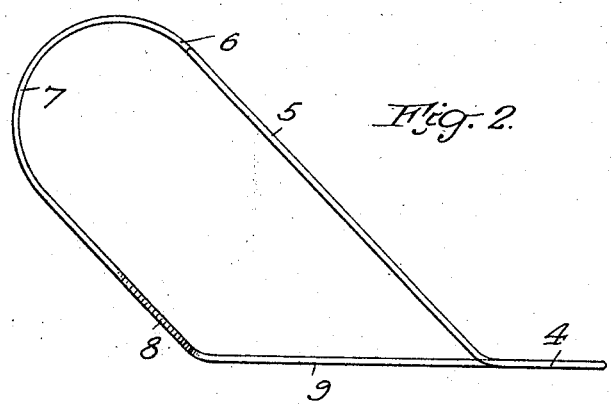
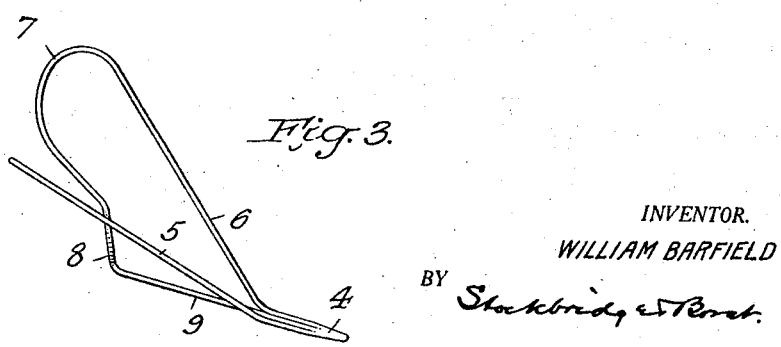
INVENTOR.
WILLIAM BARFIELD
BY Stockbridge & Borst
ATTORNEYS Patented Jan. 18, 1927.

1,614,451

UNITED STATES PATENT OFFICE.

WILLIAM BARFIELD, OF CLEARWATER, FLORIDA, ASSIGNOR TO THE HILLS BROTHERS COMPANY, A CORPORATION OF NEW YORK.

INSTRUMENT FOR REMOVING MEAT FROM CITROUS FRUITS AND THE LIKE.

Application filed March 13, 1925. Serial No. 15,235.

This invention relates to instruments for removing the meat in natural sections from citrous fruits and the like, and is particularly valuable where the meat is removed from such fruit for commercial purposes, such as canning. The meat in citrous fruits is divided into natural divisions or sections by skin-like partitions or membranes which radiate from the core, and this dividing membrane or partition is frequently bitter so that its separation from the meat is desirable and necessary. Heretofore, meat has been separated or removed manually from the pared fruit by means of a knife-like instrument which is passed along the skin-like dividing partitions or membranes to loosen the meat sections therefrom, and in doing so quite a number of separate manual operations are necessary and the meat sections are frequently broken into small pieces during their removal.

An object of this invention is to provide an improved instrument for removing the meat from citrous fruits and the like; with which the meat sections may always be removed in whole pieces and without mutilation; with which a whole section or natural division of the meat may be removed by a simple, single movement of the instrument; which permits of rapid removal of the meat divisions or sections; and which is convenient in use and relatively simple and inexpensive.

Various other objects and advantages will be apparent from the following description of an embodiment of the invention, and the novel features will be particularly pointed out hereinafter in the appended claims.

The invention comprehends the various features which will appear as the description of the invention proceeds.

In the accompanying drawing:—

Fig. 1 is a plan of a grapefruit prepared ready for the removal of the meat, with a section or division of meat partially removed by an instrument constructed in accordance with the invention;

Fig. 2 is a side elevation of the instrument; and

Fig. 3 is a perspective of the same.

Referring to the drawing, the fruit 1 is divided into natural sections 2 by skin-like partitions or membranes 3, which extend radially from the longitudinally extending core of the fruit.

The particular form of the improved instrument illustrated, is formed of wire which is bent into the desired shape and form. A stretch of wire is doubled back upon itself, intermediate of its ends, to form a piercing or tip end portion 4 which serves to guide the instrument into the fruit, the stretches 5 and 6 of the wire extending obliquely and rearwardly from the tip end or piercing portion and also at an acute angle to one another. One of the wire stretches, such as that of the stretch 6, is bent upon itself or looped as at 7, to form a handle portion, is then offset laterally as at 8 into the plane of the piercing end portion 4, and then extends as at 9 in the plane of and in alignment with the piercing point or end portion 4, where it is joined to the latter at the point of convergence therewith of the stretches 5 and 6.

It will be noted that a plane passing through the stretches or sections 5 and 9 will make an acute dihedral angle with a similar plane passed through the stretches or sections 6 and 9, so that the wire stretches or sections 5, 6 and 9, in effect form a V-shaped scoop extending rearwardly from the piercing end or tip 4. The base stretch or section 9 may be joined to the piercing end portion 4 in any suitable manner, such as by soldering or welding it thereto. The piercing end 4 is preferably somewhat pointed or tapered, to facilitate its entrance into the fruit without too much tearing or mutilation of the meat.

In the use of the instrument, it is grasped in one hand as shown in Fig. 1, and the fruit is held in the other hand as shown also in Fig. 1. The piercing end 4 of the instrument is forced into the fruit at one end of the core and at an end of the apex edge of the dihedral angle between the side walls of a particular section. The instrument is then forced lengthwise of the core of the fruit as shown in Fig. 1, during which movement the piercing end 4 and the base stretch or section 9 will pass along the core of the fruit and serve to guide the instrument in its travel lengthwise of the core.

The stretches or sections 5 and 6, which diverge therefrom, will extend along the side walls of the particular meat section and break it loose from the skin-like dividing partitions or membranes 3, and have a scoop-like action thereon which dislodges it from the body of the fruit in an unbroken and unmutilated condition. The seeds which are exposed may be readily removed from the apex edge of the meat section. The stretches or sections 5 and 6 of the instrument may have relative springing movement toward and from one another, so that they will automatically adjust themselves to meat sections of different widths which may be encountered.

It will be observed that an entire meat section may be removed by a simple, single operation of the instrument, in practically an instant of time, with the result that but a few moments are required to remove all of the sections of meat of a fruit successively. While the instrument, as shown, may be conveniently formed of bent wire, preferably spring wire, it may also be formed of other material such as, for example, partly or entirely of ribbon-like strips of metal.

It will be noted that the loop 7 forming the handle portion is offset to one side of the V-shaped angle between the wire stretches or sections 5, 6 and 9, so that the operator's hand will not engage the fruit sections as they are disengaged. It has further been found that the operation is more convenient when the handle is offset as shown.

It will be obvious that various changes in the details, which have been herein described and illustrated for the purpose of explaining the nature of the invention, may be made by those skilled in the art within the principle and scope of the invention as expressed in the appended claims.

I claim:

1. An instrument for removing the meat in natural divisions from citrous fruits and the like, said instrument being formed of wire and having a piercing tip with two members diverging therefrom at a point distant from the end of said tip, one of the members being bent to form a handle portion by which the instrument may be manipulated.

2. An instrument for removing the meat in natural divisions from citrous fruits and the like, the same being formed of wire and having an elongated piercing tip with one member in line therewith and a pair of members diverging therefrom, at a point spaced materially from its piercing end, and making an acute angle with one another and an obtuse angle with the advance piercing end portion.

3. An instrument for removing the meat in natural divisions from citrous fruits and the like, having a piercing tip portion, a plurality of strips of wire-like material extending obliquely therefrom and diverging at an acute angle from one another, one of said strips of material being bent upon itself to form a handle portion and then connecting with the tip end portion in substantially the plane of the tip end portion, whereby the planes passing through each strip section and the portion of said one strip that lies in the plane of the tip end portion, will make an acute dihedral angle with one another.

4. An instrument for removing the meat in natural divisions from citrous fruits and the like, having a tip end portion for piercing the meat, a plurality of wire-like strips of material extending therefrom in a diverging relation, one of said strips continuing in the plane of the tip end portion, the other two strips extending obliquely thereto at a point distant from the end of the piercing tip, and diverging from one another so that the planes through the last two strips and the tip end portion will make a dihedral angle having its apex edge in said one of said strips.

5. An instrument for removing the meat in natural sections from citrous fruits and the like, comprising a wire element terminating in a piercing point, two members extending obliquely from said element at a point materially distant from the piercing point whereby an elongated piercing tip is provided, said members diverging from one another at an acute angle, and a third member in line with said piercing tip.

6. An instrument for removing the meat in natural sections from citrous fruits and the like, comprising an element terminating in a piercing point and having members extending from said element at points intermediate of its ends, obliquely thereto and diverging from one another at an acute angle, said element being connected at its free rear end to the free end of one of said members to form a handle loop.

7. An instrument for removing the meat in natural divisions from citrous fruits and the like, comprising three members formed of wire diverging from one another at acute angles, two of said members being connected at their free ends in order to form a handle portion.

8. An instrument for removing the meat in natural divisions from citrous fruits and the like, comprising three members formed of wire diverging from one another at acute angles, two of said members being connected at their free ends in order to form a handle portion, and a piercing tip extending from the members at their point of convergence.

9. An instrument for removing the meat in natural divisions from citrous fruits and the like, comprising a wire doubled back upon itself intermediate of its ends for a short distance to form a piercing point, and then diverging from one another at an acute angle and obliquely to the piercing end, one free end of said wire being looped back upon itself to form a handle portion, and then extending laterally into the plane of the piercing point, then to said piercing point to which it is connected.

In witness whereof, I hereunto subscribe my signature.

WILLIAM BARFIELD.